United States Patent
Huang et al.

(10) Patent No.: US 8,768,518 B2
(45) Date of Patent: Jul. 1, 2014

(54) METHOD OF SETTING EXCLUSIVE CONTROLLER FOR WATER HEATER

(75) Inventors: Chung-Chin Huang, Taichung (TW);
Chin-Ying Huang, Taichung (TW);
Hsin-Ming Huang, Taichung (TW);
Hsing-Hsiung Huang, Taichung (TW);
Kuan-Chou Lin, Taichung (TW);
Yen-Jen Yeh, Dounan Township (TW)

(73) Assignee: Grand Mate Co., Ltd., Taichung (TW)

( * ) Notice: Subject to any disclaimer, the term of this patent is extended or adjusted under 35 U.S.C. 154(b) by 87 days.

(21) Appl. No.: 13/487,549

(22) Filed: Jun. 4, 2012

(65) Prior Publication Data
US 2013/0325186 A1 Dec. 5, 2013

(51) Int. Cl.
*G05B 19/18* (2006.01)
*G05B 11/01* (2006.01)
*G01M 1/38* (2006.01)
*G05B 23/02* (2006.01)

(52) U.S. Cl.
USPC ............... 700/275; 700/3; 700/20; 340/3.53; 340/9.15

(58) Field of Classification Search
None
See application file for complete search history.

(56) References Cited

U.S. PATENT DOCUMENTS

| | | | | |
|---|---|---|---|---|
| 4,745,945 A | * | 5/1988 | Miller | 137/334 |
| 4,872,485 A | * | 10/1989 | Laverty, Jr. | 137/624.11 |
| 6,625,464 B1 | * | 9/2003 | Bandy et al. | 455/503 |
| 2003/0031319 A1 | * | 2/2003 | Abe et al. | 380/232 |
| 2003/0093670 A1 | * | 5/2003 | Matsubayashi et al. | 713/168 |
| 2008/0163334 A1 | * | 7/2008 | Perich et al. | 726/1 |
| 2008/0229406 A1 | * | 9/2008 | Go | 726/16 |

* cited by examiner

*Primary Examiner* — Sean Shechtman
(74) *Attorney, Agent, or Firm* — Tracy M. Heims; Apex Juris, pllc

(57) ABSTRACT

A method of setting an exclusive controller for a water heater, wherein a plurality of controllers are provided for user to operate to control a water heater, includes the steps of: a) Provide each controller an identification code, and saving the identification codes of the controllers in a processor of a water heater; b) Input a command through a controller, and sending the command to the processor of the water heater, wherein the command includes the identification code of the controller; c) Make a recording that the controller is an exclusive controller when the identification code in the command is identical to the identification code in the processor; d) Execute the command from the exclusive controller to control the water heater, and rejecting commands from the other controllers; and e) Repeat the step d until the recording of the exclusive controller is canceled.

8 Claims, 3 Drawing Sheets

US 8,768,518 B2

METHOD OF SETTING EXCLUSIVE CONTROLLER FOR WATER HEATER

BACKGROUND OF THE INVENTION

1. Field of the Invention

The present invention relates generally to a water heater and a method of setting the control commands, and more particularly to a method of setting an exclusive controller for a water heater.

2. Description of the Related Art

Water heater equipped with micro-computer to control temperature to supply hot water with constant temperature allows user to set the water temperature. However, the control panel is mounted on the water heater so that user has to go the water heater to operate it. It is very inconvenient when the water heater is mounted at outside of the house. Therefore, a remote control water heater is provided to overcome aforesaid drawback. Such water heater has at least a remote control panel mounted in the house, such as in kitchen, laundry room, bedroom, or bathroom, so that the user may control the water heater through the remote control panel. However, the commands from different control panels may be in conflict when different users give different commands. For example, one may change the setting of the water heater through the control panel, and doesn't find that someone else is still taking shower and he/she had already set the water heater, and the one who is taking shower may be shocked by the sudden change of water temperature. It may cause serious problems to the one who is taking shower, such as scalded by the high temperature water, cardiovascular diseases caused by the sudden change of water temperature, or something like that. In conclusion, such water heater system provides an unsafe operation.

SUMMARY OF THE INVENTION

The primary objective of the present invention is to provide a method of setting an exclusive controller of a water heater to provide the water heater with an efficient and safe operation.

According to the objective of the present invention, a method of setting an exclusive controller for a water heater, wherein a plurality of controllers are provided for user to operate to control a water heater, includes the steps of:

a) Provide each controller an identification code, and saving the identification codes of the controllers in a processor of a water heater;

b) Input a command through a controller, and sending the command to the processor of the water heater, wherein the command includes the identification code of the controller;

c) Make a recording that the controller is an exclusive controller when the identification code in the command is identical to the identification code in the processor;

d) Execute the command from the exclusive controller to control the water heater, and rejecting commands from the other controllers; and e) Repeat the step d until the recording of the exclusive controller is canceled.

Therefore, the present invention may provide the water heater to be operated in a safe and efficient condition.

DETAILED DESCRIPTION OF THE INVENTION

Figure 1:
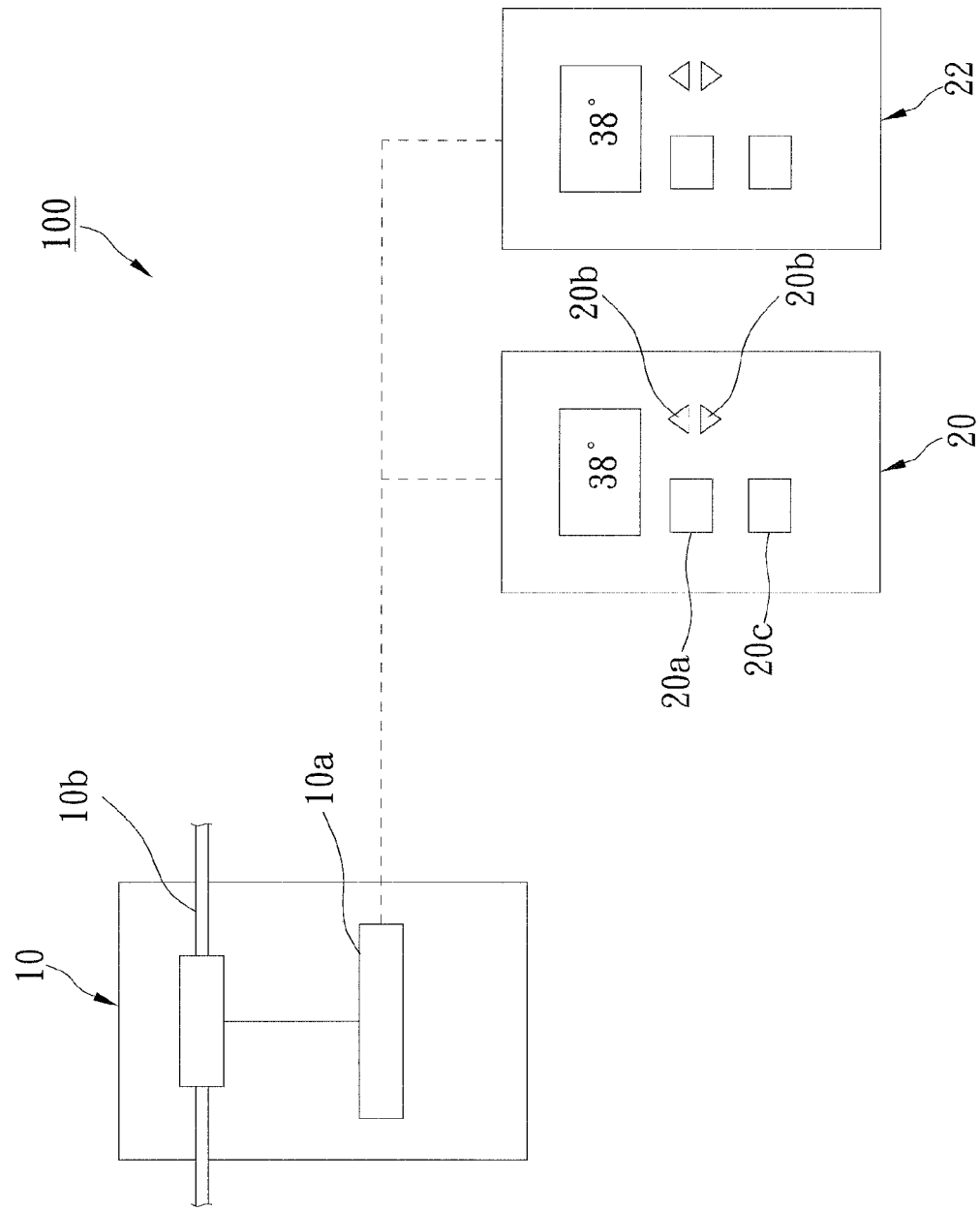
FIG. 1 is a sketch diagram of the water heater system of a preferred embodiment of the present invention.

FIG. 1 shows a water heater system 100 applied in a method of the preferred embodiment of the present invention, including a water heater 10, a first controller 20, and a second controller 22.

The water heater 10 has a processor 10a and a pipe 10b. The processor 10a controls a combustor (not shown) to heat water to a setting temperature, and the pipe 10b may supply hot water to a desire place. The processor 10a receives commands from the first controller 20 and the second controller 22 and controls the combustor accordingly. In the present embodiment, the first and the second controllers 20, 22 are connected to the processor 10a through wireless connection, and the first controller 20 is mounted in the bathroom and the second controller 22 is mounted in the kitchen. Each controller 20, 22 has a start key 20a, two adjusting keys 20b to change temperature, and a cancel key 20c.

Figure 2:
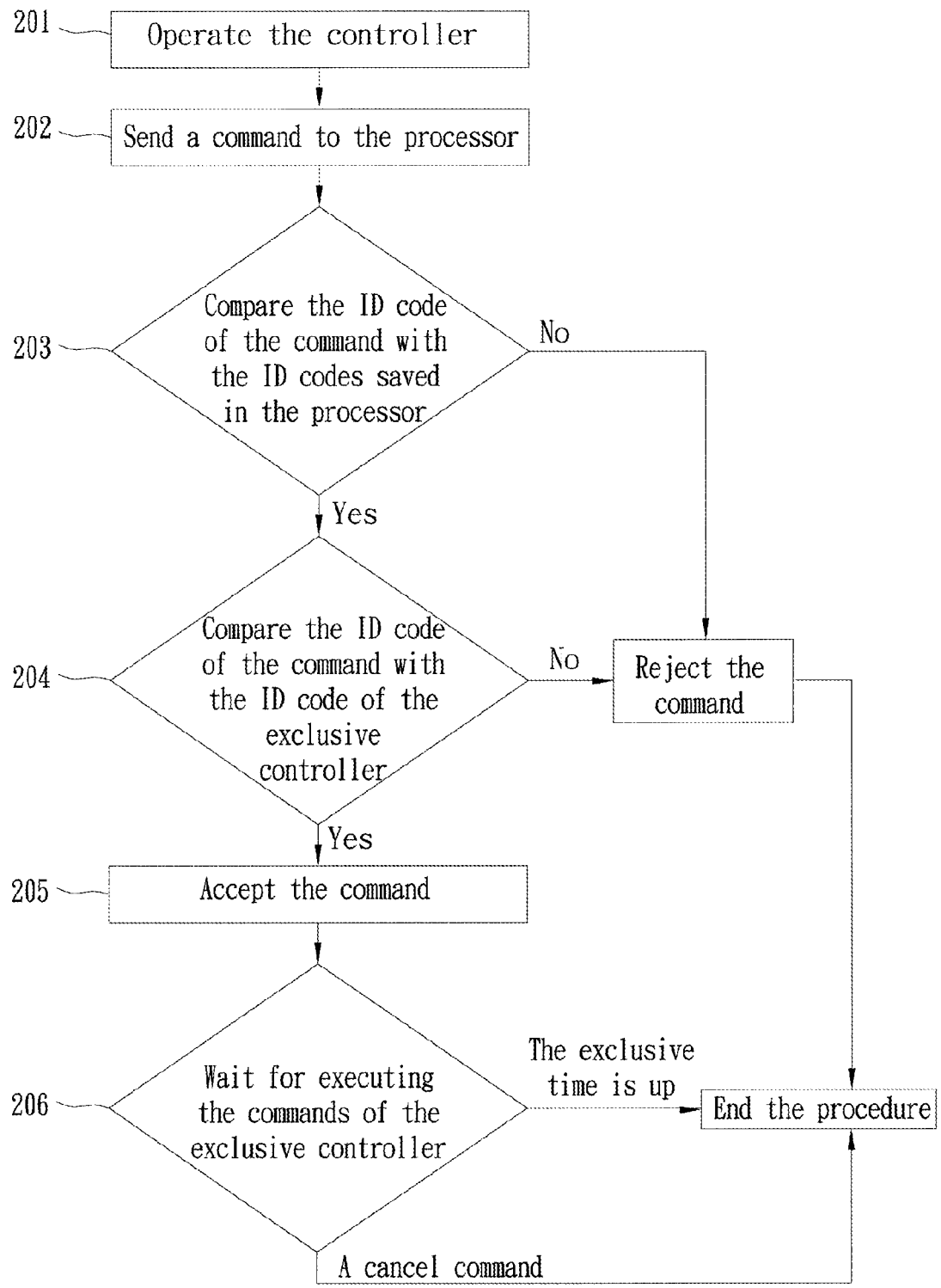
FIG. 2 is a flow chart of the exclusive setting procedure of the preferred embodiment of the present invention.

FIG. 2 shows an exclusive controller setting procedure of the water heater system 10, which includes the following steps:

In the step 201, each controller 20, 22 has an identification (ID) code for the processor 10a to identify them, and the ID codes are saved in the processor 10a in advance. For understanding, the first controller 20 has a first ID code, and the second controller 22 has a second ID code.

In the step 202, when a user wants to take a shower, he/she presses the start key 20a of anyone of the controllers (here, we take the first controller 20 for example), and then the first controller 20 sends the processor 10 a start command, in which the first ID code is included.

In the step 203, in order to avoid the command being interrupted by another, the processor 10a receives the start command and checks the ID code therein to identify the controller. If the processor 10a cannot identify the ID code, it means that it is an unknown command, and then the processor 10a rejects the command and ends the setting procedure. Otherwise, goes to the step 204.

In the step 204, the processor 10a checks that whether there is an existing exclusive controller. The processor 10a rejects the start command and ends the setting procedure when there already is an exclusive controller, otherwise, the processor 10a makes a recording that the first controller 20 is an exclusive controller, and goes to the next step 205.

In the step 205, the processor 10a provides the first controller 20 an exclusive time. The processor 10a will wait for commands from the first controller 20 in the exclusive time. The commands are made by user operating the first controller 20. In other words, the processor 10a only accepts the commands from the first controller 20 in the exclusive time. The exclusive time may be ten minutes, twenty minutes for user to input the commands through the first controller 20.

In the step 206, the processor 10a rejects the command from any other controller in the exclusive time. For example, when one presses any key of the second controller 22 in the exclusive period, the command will be rejected to make sure that only the commands from the first controller 20 will be executed in the exclusive period. The command may be a temperature control command, cancel command, or other relative commands to control the water heater 10.

The processor 10a cancels the exclusive controller, and accepts the start command from any controller again when the user presses the cancel key 20c in the exclusive time to send a cancel command to the processor 10, or the exclusive time is up and no command is received from the first controller 20.

The recording of the exclusive controller will be remained when the command from the exclusive controller is executing even when the exclusive time is up. The exclusive time starts from a time when the processor 10a complete the command, and no command of the exclusive controller is waiting for execution.

Except the conditions of cancelling the exclusive controller, the system will automatically cancel the recording of the exclusive controller and end setting procedure when some specified situations occurred in the water heater.

Figure 3:
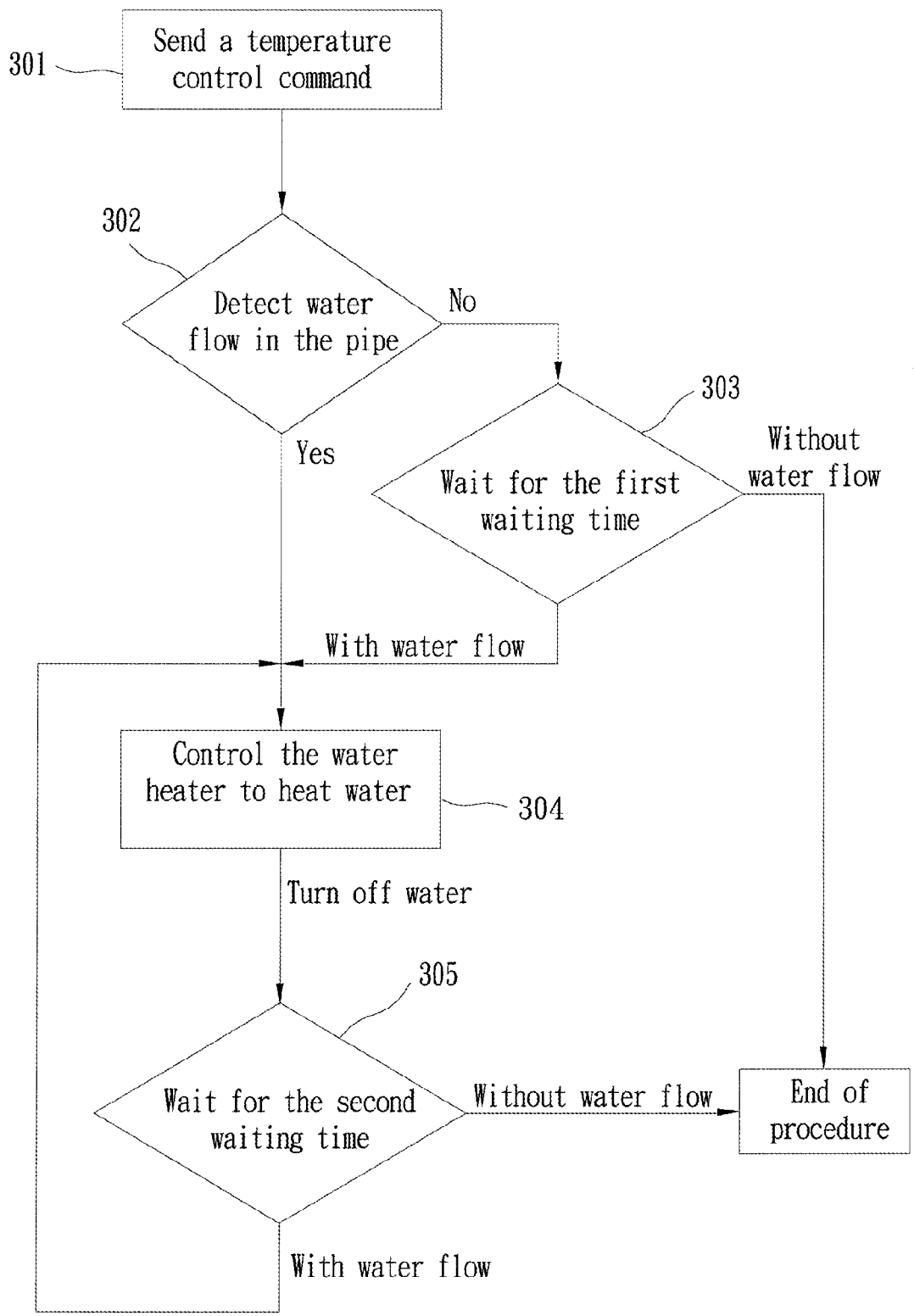
FIG. 3 is a flow chart of the temperature setting procedure of the preferred embodiment of the present invention.

FIG. 3 shows a flow chart of a temperature setting procedure of the processor 10a executing the temperature control command of the first controller 20 (the exclusive controller).

In the step 301, a user presses the temperature key 20b of the first controller 20 in the exclusive time, and then the first controller 20 provides a temperature control command accordingly to the processor 10.

In the step 302, the processor 10a checks whether there is any water flowing through the pipe 10b after it receives the temperature control command, and then goes to the step 303 when no water flow is detected, otherwise goes to the step 304.

In the step 303, no water flow is detected in the pipe 10b, and the processor 10a starts a first waiting time to wait for water coming in. The procedure will go to the step 304 when water flow is detected in the pipe 10 in the first waiting time, otherwise the processor 10a cancels all the commands from the first controller 20 and ends the temperature setting procedure, and the recording of the exclusive controller will be cancelled as well. The first waiting time may be ten minutes to twenty minutes according to the requirement.

In the step 304, there is water flowing through the pipe 10b, and the processor 10a controls the combustor (not shown) to heat water to a setting temperature, and kept it in that temperature. The procedure will go to the step 305 when one turns off water, and therefore no water flow is detected in the pipe 10b.

In the step 305, the processor 10a starts a second waiting time when no water flow is detected in the pipe 10b, and cancels all the commands from the first controller 20 when no water flow is detected in the pipe 10b in the second waiting time and ends the temperature setting procedure, and the recording of the exclusive controller will be cancelled at the same time. The user may temporally turn off water, such as turn off for soaping, and turn on again in the second waiting time. In other words, when water flow is detected again in the second waiting time, it will go back to the step 304 to supply hot water with setting temperature.

The second waiting time may be ten minutes to twenty minutes according to the requirement.

Above steps are the procedures of setting water temperature through the exclusive controller (the first controller 20).

In the embodiment, the controllers may be more than two, and only one controller is allowed to control the water heater. The start key 20a and the cancel key 20c may be made in one key, and it will send the cancel command when user presses the key for a long time. Beside, the start command may be sent by one pressing any key of the controller. In this condition, ID code will be included in the command to control the processor accordingly.

The method of the present invention may provide the water heater operated in a safe condition. The description above is just a few preferred embodiments of the present invention and the equivalence of the present invention is still in the scope of the claim of the present invention.

What is claimed is:

1. A method of setting an exclusive controller for a water heater, wherein a plurality of controllers are provided for a user to operate to control a water heater, the method comprising the steps of:
    a) providing each controller an identification code, pre-storing the identification codes of the controllers in a processor of a water heater, and arranging the processor to identify each controller based on its identification code;
    b) inputting a command through a controller, and sending the command to the processor of the water heater, wherein the command includes the identification code of the controller;
    c) making a recording that the controller is an exclusive controller when the identification code in the command is identical to the identification code in the processor, and executing the command to control the water heater;
    d) receiving a command from any one of the controllers, and executing the command to control the water heater when the identification code of the command is identical to the identification code of the exclusive controller, or rejecting the command when the identification code of the command is not identical to the identification code of the exclusive controller;
    e) repeating the step d until the recording of the exclusive controller is canceled; and
    f) rejecting the command if its identification code does not match any identification codes pre-stored in the processor.

2. The method as defined in claim 1, wherein the recording of the exclusive controller is canceled when no command is inputted through the exclusive controller in an exclusive time.

3. The method as defined in claim 2, wherein the recording of the exclusive controller is remained when the command of the exclusive controller is executing or waits for execution.

4. The method as defined in claim 1, wherein the recording of the exclusive controller is canceled by a person inputting a cancel command through the exclusive controller.

5. The method as defined in claim 1, wherein the command further includes a temperature control command to be executed to control the water heater to heat water in a pipe to a predetermined temperature.

6. The method as defined in claim 5, wherein the recording of the exclusive controller and the temperature control command are canceled when no water flow is detected in the pipe of the water heater in a first waiting time.

7. The method as defined in claim 5, wherein the recording of the exclusive controller and the temperature control command are canceled after a second waiting time, and the second waiting time starts from a time when a person turns off water.

8. The method as defined in claim 7, further comprising the step of detecting water flow in the pipe to determine whether the water is turned off.

* * * * *